United States Patent
Heiden et al.

(10) Patent No.: US 8,362,398 B2
(45) Date of Patent: Jan. 29, 2013

(54) VEHICLE RADIANT HEATING CONTROL SYSTEM

(75) Inventors: David Heiden, Clarkston, MI (US); Randall Johnson, White Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 526 days.

(21) Appl. No.: 12/627,748

(22) Filed: Nov. 30, 2009

(65) Prior Publication Data

US 2011/0127246 A1 Jun. 2, 2011

(51) Int. Cl.
*B60L 1/02* (2006.01)

(52) U.S. Cl. .......................... 219/202; 219/482

(58) Field of Classification Search ............. 219/202, 219/482
See application file for complete search history.

(56) References Cited

U.S. PATENT DOCUMENTS

| | | | |
|---|---|---|---|
| 1,852,599 A | 4/1932 | Zaiger et al. | |
| 1,917,141 A | 7/1933 | Middleton | |
| 2,414,520 A | 1/1947 | Greenwald | |
| 2,681,409 A | 6/1954 | Dobbins | |
| 3,619,555 A | 11/1971 | Bassett, Jr. | |
| 5,275,012 A * | 1/1994 | Dage et al. | 62/208 |
| 6,118,099 A * | 9/2000 | Lake et al. | 219/202 |
| 6,262,400 B1 * | 7/2001 | Urbank et al. | 219/497 |
| 7,248,790 B2 | 7/2007 | Misumi et al. | |
| 7,781,704 B2 * | 8/2010 | Fernandez et al. | 219/497 |
| 2004/0004070 A1 * | 1/2004 | Sullivan et al. | 219/494 |

FOREIGN PATENT DOCUMENTS

| | | |
|---|---|---|
| JP | 2006-193067 A | 7/2006 |
| JP | 2008-249243 A | 10/2008 |

* cited by examiner

*Primary Examiner* — Eugene Lee

(74) *Attorney, Agent, or Firm* — Global IP Counselors, LLP

(57) ABSTRACT

A vehicle radiant heating control system is provided that comprises a radiant heating element, a power source and a controller. The power source is operatively connected to the radiant heating element. The controller operatively controls the radiant heating element and the power source. The controller operates the radiant heating element by intermittently supplying power generated by the power source to the radiant heating element.

20 Claims, 6 Drawing Sheets

VEHICLE RADIANT HEATING CONTROL SYSTEM

CROSS-REFERENCE TO RELATED APPLICATIONS

This application is a related application of U.S. patent application Ser. No. 12/359,804, filed on Jan. 26, 2009. The entire disclosure of U.S. patent application Ser. No. 12/359,804 is hereby incorporated herein by reference.

BACKGROUND

The present invention generally relates to a vehicle radiant heating control system. More specifically, the present invention relates to supplying heat to a vehicle cabin interior space using a radiant heating element in a vehicle having a 12 VDC battery.

Background Information

For many years, automotive vehicles have been provided with climate control systems (e.g., heating, ventilating and air conditioning (HVAC) systems) in order to provide a more comfortable environment for the driver and any passengers. Passenger compartments of vehicles have traditionally been warmed by circulating air such that it contacts a heater core associated with a coolant loop of an internal combustion engine. Thus, the heater core is normally heated by the engine coolant from the vehicle's engine. In cold conditions, when the vehicle is first started, the engine is cold. Thus, the engine coolant is also cold and is insufficient to warm the air entering the vehicle cabin. This results in a period of time in which the cabin remains below the desired cabin temperature.

In recent years, hybrid vehicles and electric vehicles have become more popular. Given the vehicle market trend toward hybrid vehicles and electric vehicles, new ways to generate cabin heat for occupants are being explored. As mentioned above, passenger compartments of vehicles have traditionally been warmed by circulating air such that it contacts a heater core. However, such a heater core would not be present in an electric vehicle. Also, even in the case of an internal combustion engine of a hybrid vehicle, it can often take a long time for a heater core to warm up on a very cold day. Thermally radiant electrical devices are often used as heating elements (e.g., heat lamps to keep food warm) and have been proposed for use in vehicles. For example, use of an infrared heater has been proposed in U.S. Pat. No. 3,619,555 to Bassett, Jr. (assigned to General Motors Corporation). However, it has been discovered that radiant heating elements are typically high-wattage devices powered by AC mains, which makes them less feasible for use in vehicles since vehicle electronics are usually powered by a 12 volt DC battery or other direct current battery source.

SUMMARY

In view of the state of the known technology, one object of the present invention is to provide a vehicle radiant heating control system that is well suited for vehicles having a direct current battery source.

In accordance with one aspect of the present invention, a vehicle radiant heating control system is provided that comprises a radiant heating element, a power source and a controller. The power source is operatively connected to the radiant heating element. The controller operatively controls the radiant heating element and the power source. The controller operates the radiant heating element by intermittently supplying power generated by the power source to the radiant heating element.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
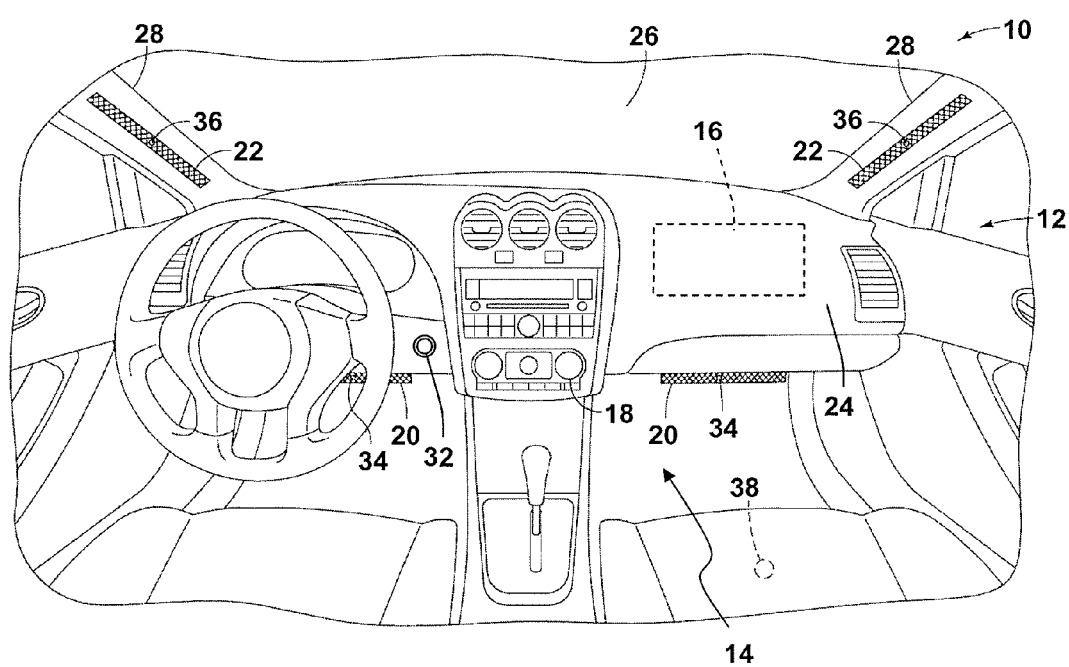
FIG. 1 is a partial perspective view of a vehicle cabin interior space of a vehicle equipped with a vehicle radiant heating control system in accordance with one embodiment.

Referring initially to FIG. 1, a hybrid vehicle 10 is illustrated with a vehicle cabin interior space 12 that is equipped with a vehicle radiant heating control system 14 in accordance with one embodiment. The operations of the hybrid vehicle 10 are well known, and thus, the operations of the hybrid vehicle 10 will not be discussed herein. Of course, it will be apparent to those skilled in the art from this disclosure that the vehicle radiant heating system 14 illustrated herein can also be adapted to electric vehicles and conventional internal combustion engine vehicles as needed and/or desired. In this illustrated embodiment, the vehicle radiant heating control system 14 is equipped with, among other things, an HVAC controller 16, a user interface 18, a pair of lower radiant heating elements 20 and a pair of upper radiant heating elements 22 for heating the cabin interior space 12 to a desired temperature.

Still referring to FIG. 1, in the case of the hybrid vehicle 10, the front portion of the vehicle cabin interior space 12 is at least partially defined by a dashboard 24 and a windshield 26, which is supported by a pair of A-pillars 28. The vehicle radiant heating control system 14 will typically be primarily installed behind the dashboard 24 and in the A-pillars 28. Of course, it will be apparent from this disclosure that other vehicle installation configurations are possible. As seen in FIG. 1, the lower radiant heating elements 20 are integrated into the vehicle cabin and aimed at the occupants' legs to give them a warmth sensation with reduced lamp power consumption. The upper radiant heating elements 24 are integrated into the vehicle cabin and aimed at the windshield 26 to reduce moisture accumulation (e.g., defog the dashboard 26). For these reasons, the lower radiant heating elements 20 are disposed in the foot-wells and the upper radiant heating elements 24 are disposed in A-pillars 28.

Figure 2:
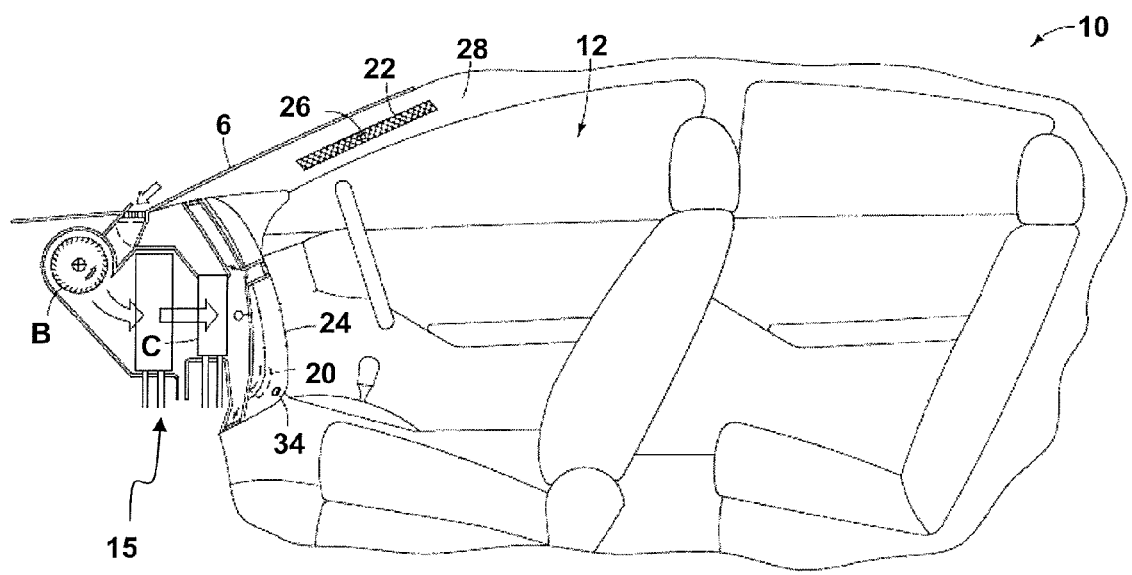
FIG. 2 is a side elevational view of the vehicle cabin interior space of the vehicle illustrated in FIG. 1 with the vehicle radiant heating control system.

As seen in FIG. 2, when the vehicle 10 is a hybrid vehicle as shown or a conventional internal combustion engine vehicle, then the radiant heating elements 20 and 22 of the vehicle radiant heating control system 14 constitute a supplemental heating system for complementing an air-circulation heating system 15 that is a conventional coolant based heating system. In other words, the vehicle radiant heating control system 14 supplements heating operations of the air-circulation heating system 15 in the vehicle 10. The vehicle radiant heating control system 14 and the air-circulation heating system 15 are both controlled by the HVAC controller 16 via the user interface 18.

As schematically, shown in FIG. 2, the air-circulation heating system 15 has, among other things, a blower B and a heater core C, with ductwork for directing the heated air to the vehicle cabin interior space 12. Basically, in vehicles with liquid-cooled engines, the engine heat (by-product of the combustion process) contained in the coolant is used to the vehicle cabin interior space 12. The heater core C consists of tubes and fins, and has the same basic design as the engine radiator. Engine coolant from the internal combustion engine of the vehicle 10 flows through the tubes of the heater core C, while air flows through the fins of the heater core C. The blower B can be a constant-speed or adjustable-speed electric blower, which forces the warmed air into the vehicle cabin interior space 12. Since the air-circulation heating system 15 can be a conventional heating system that is commonly used in most vehicles, the air-circulation heating system 15 will not be discussed and/or illustrated in further detail herein.

Figure 3:
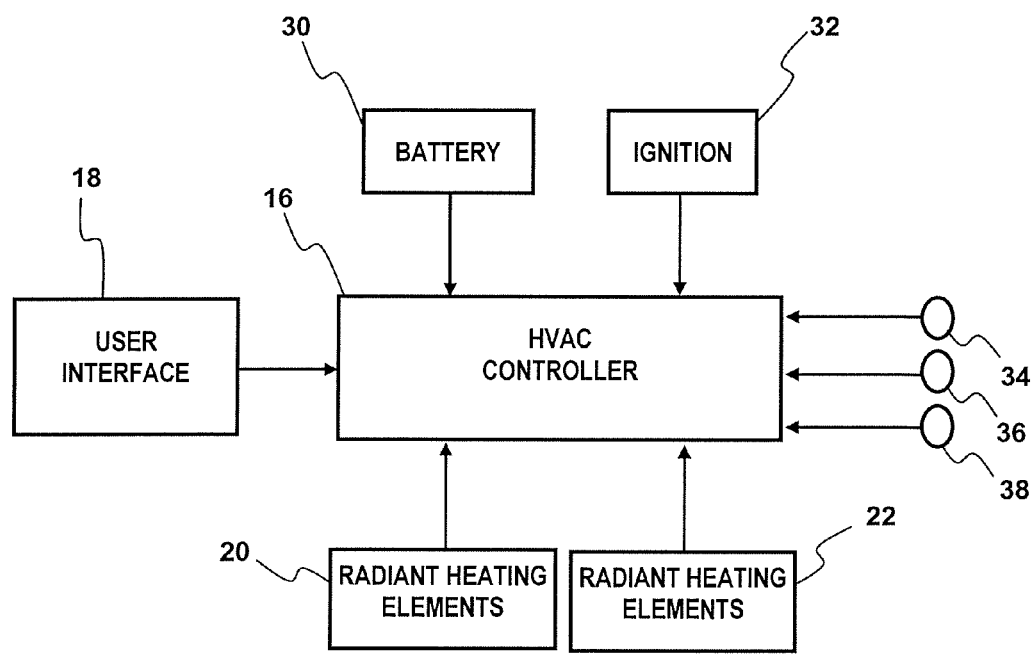
FIG. 3 is a simplified block diagram of the vehicle radiant heating control system in accordance with the illustrated embodiment.

As explained below and as seen in FIG. 3, the vehicle radiant heating control system 14 uses a conventional 12 volt direct current battery 30 to operate the radiant heating elements 20 and 22. The 12 volt direct current battery 30 constitutes a power source that is operatively connected to the radiant heating elements 20 and 22. In other words, in this illustrated embodiment, the battery 30 is a power source that generates power having a 12-volt direct current electric potential. Of course, it will be apparent from this disclosure that the battery 30 can be any direct current power source used in vehicles. The HVAC controller 16 operatively controls the radiant heating elements 20 and 22 and the battery 30 by controlling the power supplied to the radiant heating elements 20 and 22 from the battery 30. In this illustrated embodiment, the HVAC controller 16 operates the radiant heating elements 20 and 22 by intermittently supplying power generated by the battery 30 to the radiant heating elements 20 and 22 so as to attain the desired cabin temperature as explained below.

With the arrangement of this illustrated embodiment, the radiant heating elements 20 and 22 of the vehicle radiant heating control system 14 can use off-the-shelf bulbs (e.g., commercial 250 watt and 500 watt infrared bulbs). Thus, the vehicle radiant heating control system 14 of the illustrated embodiment significantly reduces costs in comparison to those systems requiring specialized heating elements in that the vehicle radiant heating control system 14 of the illustrated embodiment is capable of utilizing off-the-shelf bulbs.

In this illustrated embodiment, the vehicle radiant heating control system 14 is activated by turning on a vehicle ignition 32 and deactivated by turning off the vehicle ignition 32. In addition to the vehicle ignition 32, the user interface 18 can be provided with an on/off switch for activating and deactivating the vehicle radiant heating control system 14. Thus, the vehicle ignition 32 is operatively connected to the HVAC controller 16, such that the vehicle ignition 32 enables operation of the HVAC controller 16 when the vehicle ignition 32 is turned on.

The HVAC controller 16 preferably includes a microcomputer with an HVAC control program that controls heating of the vehicle cabin interior space 12. Preferably, the HVAC controller 16 sets a target surface temperature or temperatures, depending on the heating mode, and controls the lower and upper radiant heating elements 20 and 22 towards the target surface temperature(s) based on an effective or estimated surface temperature directly in front of the upper infrared heater(s) in the vehicle cabin interior space 12, as discussed below. The HVAC controller 16 can also include other conventional components such as an input interface circuit, an output interface circuit, and storage devices such as a ROM (Read Only Memory) device and a RAM (Random Access Memory) device. The microcomputer of the HVAC controller 16 is programmed to control at least operation of the radiant heating elements 20 and 22. Basically, the HVAC controller 16 controls the radiant heating elements 20 and 22 so as to automatically maintain an interior surface temperature of the vehicle cabin interior space 12 to a user target temperature. In other words, sensors monitor the temperatures of the vehicle's interior to determine if the user target surfaces have been reached. The HVAC controller 16 processes this information and compares it with the target temperature.

The user interface 18 is operatively connected to the HVAC controller 16, with the HVAC controller 16 activating the radiant heating elements 20 and 22 via the user interface 18. The user interface 18 is also configured to allow a user to set a target cabin interior temperature for the vehicle cabin interior space 12 as well as other settings such as selecting a heating mode. These settings are carried out by the HVAC controller 16, which is operatively coupled to the components of the vehicle radiant heating control system 14 to selectively operate the radiant heating elements 20 and/or 22 to heat the vehicle cabin interior space 12. Basically, in the vehicle radiant heating control system 14, the HVAC controller 16 is operatively coupled to the lower and upper radiant heating elements 20 and 22 to selectively operate the lower and upper radiant heating elements 20 and 22 at prescribed conditions, especially when the temperature directly in front of the lower radiant heating elements 20 drops below a prescribed temperature range as described below. In particular, the operation times of the radiant heating elements 20 and 22 are controlled by achievement of a target surface temperature rather than cabin interior air temperature.

Preferably, the user interface 18 allows the user to set to various heating modes. In other words, the user interface 18 includes a mode input switch in which the user can select a floor heat mode (e.g., operation of only the lower radiant heating elements 20), a defog or defrost mode (e.g., operation of only the upper radiant heating elements 22), or a full heat mode (e.g., both the lower and upper radiant heating elements 20 and 22). During each of these modes, the blower B can be either automatically or manually operated so that the blower B can be turned "on", set to a preferred blower speed and turned "off" as needed and/or desired. For example, in the case of the defog or defrost mode, the blower B can be automatically turned "on" and adjusted to a preset speed when the defog or defrost mode is selected. In this automatic defog or defrost mode, the user interface 18 can be set to a plurality of defog or defrost settings with the target surface temperature of the upper radiant heating elements 22 and/or blower speed changing with each setting. Alternatively, in the case of the defog or defrost mode, the blower B can be manually operated and set to one of a plurality of preset speeds when the defog or defrost mode is selected.

The lower and upper radiant heating elements 20 and 22 can be any of a variety of different types and styles of infrared elements that produce only infrared waves. Although some infrared elements are designed to produce a certain type of visible light wave or other types of waves for specific purposes (for example, to indicate when the element is being powered), most infrared elements for use in the vehicle infrared heating control system 14 substantially produce only infrared waves. Assorted AC radiant heating elements are commercially available. However, infrared heat lamps in the non-visible range, particularly carbon, are especially suitable for the lower and upper radiant heating elements 20 and 22. Preferably, the lower and upper radiant heating elements 20 and 22 emit either IR-B waves or IR-C waves. The IR-B wavelength range is preferably 2000 to 3500 nm. While the IR-C wavelength range is preferably greater than 3500 nm. The lower and upper radiant heating elements 20 and 22 can be operated with about 150 to 250 watts of input power.

Long Waves (IR-C waves with wavelengths longer than 2000 nm) are also effective for heat integration while at the same time being substantially incapable of detection by vehicle occupants. For this reason, the lower radiant heating elements 20 are preferably IR-C type infrared elements. However, with respect to the upper radiant heating elements 22, water molecules typically do not absorb IR-C waves. Thus, window defogging performance may suffer somewhat if IR-C type infrared elements are selected for the upper radiant heating elements 22 over IR-B type infrared elements. For this reason, the upper radiant heating elements 22 are preferably IR-B type infrared elements.

As mentioned above, the lower radiant heating elements 20 are arranged in the dashboard 24 so that the lower radiant heating elements 20 are aimed into the foot-wells to supply heat to the foot-wells of the vehicle cabin interior space 12. Each of the lower radiant heating elements 20 has a temperature sensor 34 that is mounted to a grill or lens of the dashboard 24 in front of the lower radiant heating elements 20. The temperature sensors 34 are operatively connected to the HVAC controller 16, with the temperature sensors 34 detecting the temperatures of the lower radiant heating elements 20. The sensors 34 are also used to limit the temperature of the grill or lens surface that is heated and that vehicle occupants may potentially contact. The sensor's temperature (after mathematical adjustment based on heat transfer properties) is used to control the temperature of a target surface within the cabin (passenger feet, windshield, etc.). Alternatively, one of the temperature sensors 34 alone may be used to regulate operation of both of the lower radiant heating elements 20. However, if both of the temperature sensors 34 are used with the lower radiant heating elements 20, then the vehicle radiant heating control system 14 can independently adjust the heat output to the driver's side of the vehicle cabin with respect to the passenger's side of the vehicle cabin. In this way, the user interface 18 can independently set target surface temperatures for the driver's side of the vehicle cabin and the passenger's side of the vehicle cabin.

In the illustrated embodiment, a passenger presence sensor 38 is provided in the passenger's seat to determine whether a passenger is present in a front passenger seat of the vehicle cabin interior space 12. The passenger presence sensor 38 is operatively connected to the HVAC controller 16 for operation by the HVAC controller 16, with the passenger presence sensor 38 detecting an occupancy status of a passenger seat and sending a signal to the HVAC controller 16 to indicate when the seat is occupied or vacant. Using this passenger presence sensor 38, the controller 16 can automatically perform a stopping operation of the lower infrared heater 20 that is located on the passenger's side of the vehicle cabin based on a detection result of the passenger presence sensor 38 indicating that the front passenger seat of the vehicle cabin interior space 12 is empty. In other words, the HVAC controller 16 suspends operation of the lower radiant heating element 20 on the passenger's side when the passenger presence sensor 38 detects an occupancy status indicative of the passenger seat being vacant. The passenger presence sensor 38 can be of the same type that is also used for "enabling" or "disabling" the passenger's air bag(s) function.

As mentioned above, the upper radiant heating elements 22 are arranged in the A-pillars 28 adjacent the dashboard 26 to apply heat across an interior surface of the dashboard 26 and to supply heat to an upper area of the vehicle cabin interior space 12. Each of the upper radiant heating elements 22 has a temperature sensor 36 that is mounted to a grill or lens in front of the upper radiant heating elements 22. The temperature sensors 36 are operatively connected to the HVAC controller 16, with the temperature sensors 36 detecting the temperatures of the radiant heating elements 22. Alternatively, one of the temperature sensors 36 alone may be used with the upper radiant heating elements 22, or the temperature sensors 36 may be omitted completely from the vehicle radiant heating control system 14. If neither of the temperature sensors 36 are used with the upper radiant heating elements 22, then the temperature sensors 34 of the lower radiant heating elements 20 can be used to control the operation of the upper radiant heating elements 22.

The HVAC controller 16 intermittently supplies power to the radiant heating elements 20 and/or 22 based on the temperature(s) of the radiant heating elements 20 and/or 22 such that the HVAC controller intermittently 16 supplies power to the radiant heating elements 20 and/or 22 for a predetermined time period in the 8.33 msec range when the temperature(s) of the radiant heating elements 20 and/or 22 are below a proportional temperature T1 such as 30 degrees Celsius. The HVAC controller 16 further interrupts the supply of power to the radiant heating elements 20 and/or 22 following the predetermined proportional time period allowing the radiant heating elements 20 and/or 22 to charge for the next period.

Figure 4:
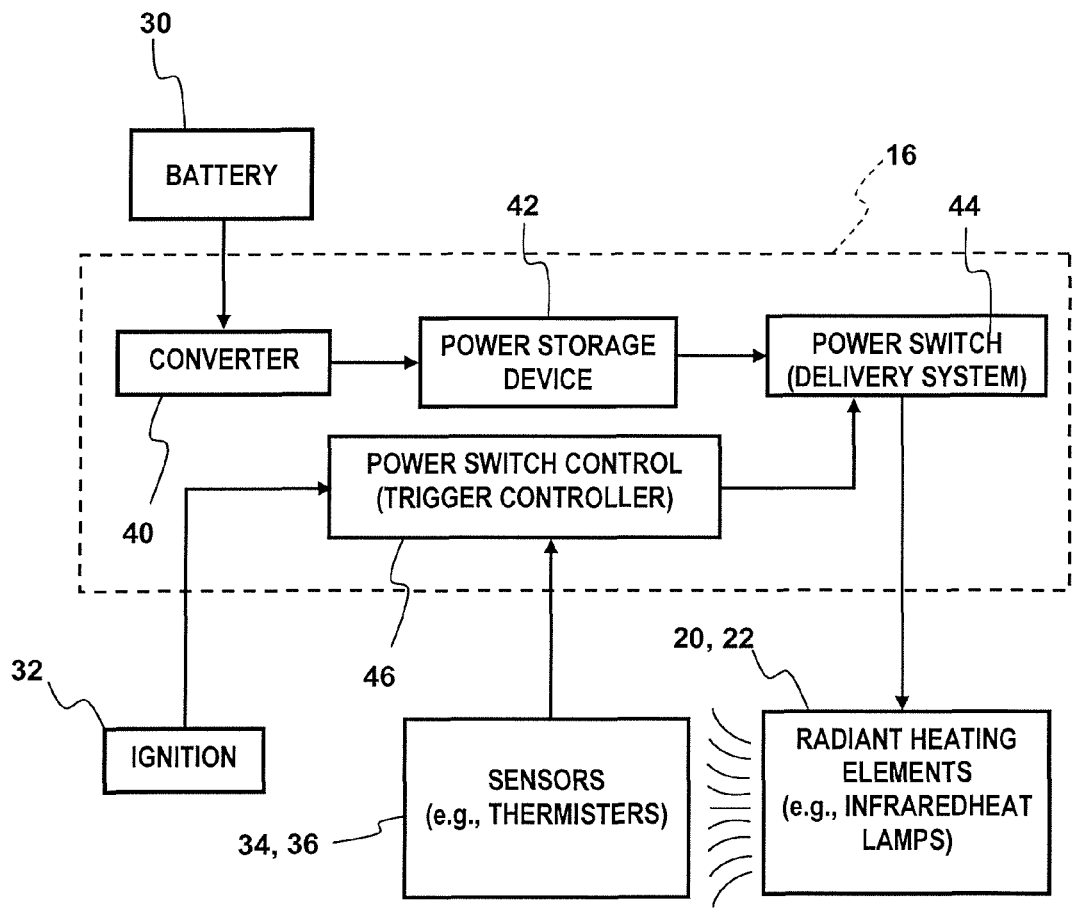
FIG. 4 is a more detailed block diagram of an HVAC controller of the vehicle radiant heating control system in accordance with the illustrated embodiment.

Turning now to FIG. 4, the more detailed block diagram of the HVAC controller 16 of the vehicle radiant heating control system 14 will now be discussed in accordance with the illustrated embodiment. The HVAC controller 16 includes, among other things, a power converter 40, a power storage device 42, a power switch 44 (e.g., a delivery system) and a power switch control 46 (e.g., a trigger controller).

The power converter 40 increases an electric potential of the power generated by the battery 30 (i.e., the power source). For example, the power converter 40 steps up the 12-volt direct current from the battery 30 to a higher DC voltage such as 100 volts. This stepped up voltage is used to charge the power storage device 42, which can be a conventional capacitor or other suitable storage device. The power from the power storage device 42 is then delivered by the power switch 44 (e.g., the delivery system) as a DC pulse voltage to the radiant heating elements 20 and/or 22 for producing heat to heat the vehicle cabin interior space 12. The power storage device 42 discharges when the HVAC controller 16 supplies power to the radiant heating elements 20 and/22. The HVAC controller 16 then charges the power storage device 42 while the HVAC controller 16 interrupts the supply of power to the radiant heating elements 20 and/or 22 by controlling the power switch 44 using the power switch control 46. The HVAC controller 16 interrupts the supply of power to the radiant heating elements 20 and/or 22 by changing an operating state of the power switch 44.

Figure 6:
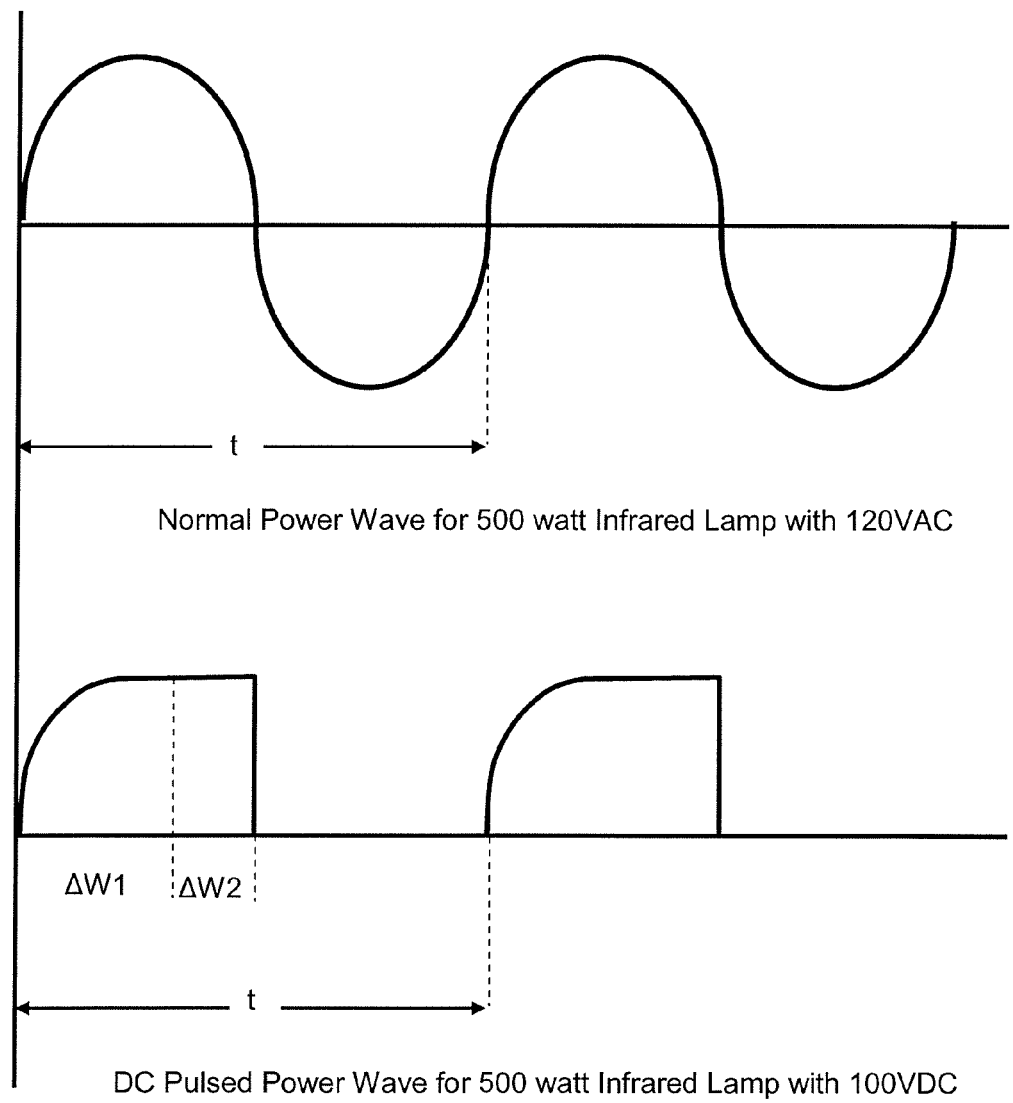
FIG. 6 is a graph containing exemplary voltage waveforms from the vehicle radiant heating control system.

As seen in FIG. 6, an upper wave shows a conventional wave of power using a 500 watt, infrared lamp operating with 120 VAC, while a lower wave shows a DC pulsed wave of power using a 500 watt, infrared lamp operating with 100 VDC. In FIG. 6, one period of the AC voltage sine wave is about 16.67 msec (e.g., t=16.67 msec). The first half of an AC voltage sine wave (e.g., the portion of the upper wave above the horizontal axis in FIG. 6) is approximately replicated by the DC pulse voltage as seen in the lower wave in FIG. 6. The DC pulsed wave includes a first portion $\Delta W1$ and a second portion $\Delta W2$. The first portion $\Delta W1$ corresponds to the charge ramp as the lamp heats. In the simplest of terms, Euler's constant in an energy store formula of $V_{tf}=(1-e^{-(t/\tau)})$ $V_{app}$ can be utilized. The second portion $\Delta W2$ corresponds to the extension of power used to extend the radiation time so the circuit can be turned off and recharged. The HVAC controller 16 can use a feedback control that monitors the temperatures of the radiant heating elements 20 and/or 22 using the temperature sensors 34 and 36. This feedback control of the HVAC controller 16 initiates a new DC pulse voltage when the temperatures of the radiant heating elements 20 and/or 22 drop below the predetermined temperature T1. The vehicle radiant heating control system 14 can make use of an off-the-shelf infrared heat bulb in a DC power system to quickly generate heat in the vehicle 10.

In this illustrated embodiment, a commercial 500 watt infrared bulb, which is designed for AC operation using 120 VAC, can be used in the radiant heating elements 20 and 22 for producing 150 to 250 watts. Thus, the bulbs designed for AC operation using 120 VAC are preferably used in the radiant heating elements 20 and 22 in order to lower the overall cost of the vehicle radiant heating control system 14. By applying a 100 VDC pulse of varying width, it is possible to cause the bulbs of the radiant heating elements 20 and 22 to radiate at a lower power so that a commercial 500 watt infrared bulb can produce 150 to 250 watts from the bulbs of the radiant heating elements 20 and 22.

In this illustrated embodiment, the radiant heating control system 14 uses the R factor in an RC circuit to discharge the power storage device 42 (e.g., a conventional capacitor) that is holding the energy to cause the bulbs of the radiant heating elements 20 and 22 to radiate. The power switch 44 (delivery system) constitutes a discharge controlling device for connecting the power storage device 42 (e.g., capacitive storage device) to the bulbs of the radiant heating elements 20 and 22 and for allowing the energy to discharge. In the illustrated embodiment, for example, the power switch 44 (delivery system) can be a low resistance energy field effect transistor (FET). While discharging, the voltage to the power storage device 42 (e.g., a conventional capacitor) continues but is unidirectional. While the bulbs of the radiant heating elements 20 and 22 are in an off state the power storage device 42 (e.g., capacitive storage device) is being charged for the next pulse. This allows for the use of off-the-shelf, commercially available infrared bulbs (e.g., 500 watt) as radiant heating elements in a vehicle having a 12 volt DC battery or other suitable direct current power source.

Figure 5:
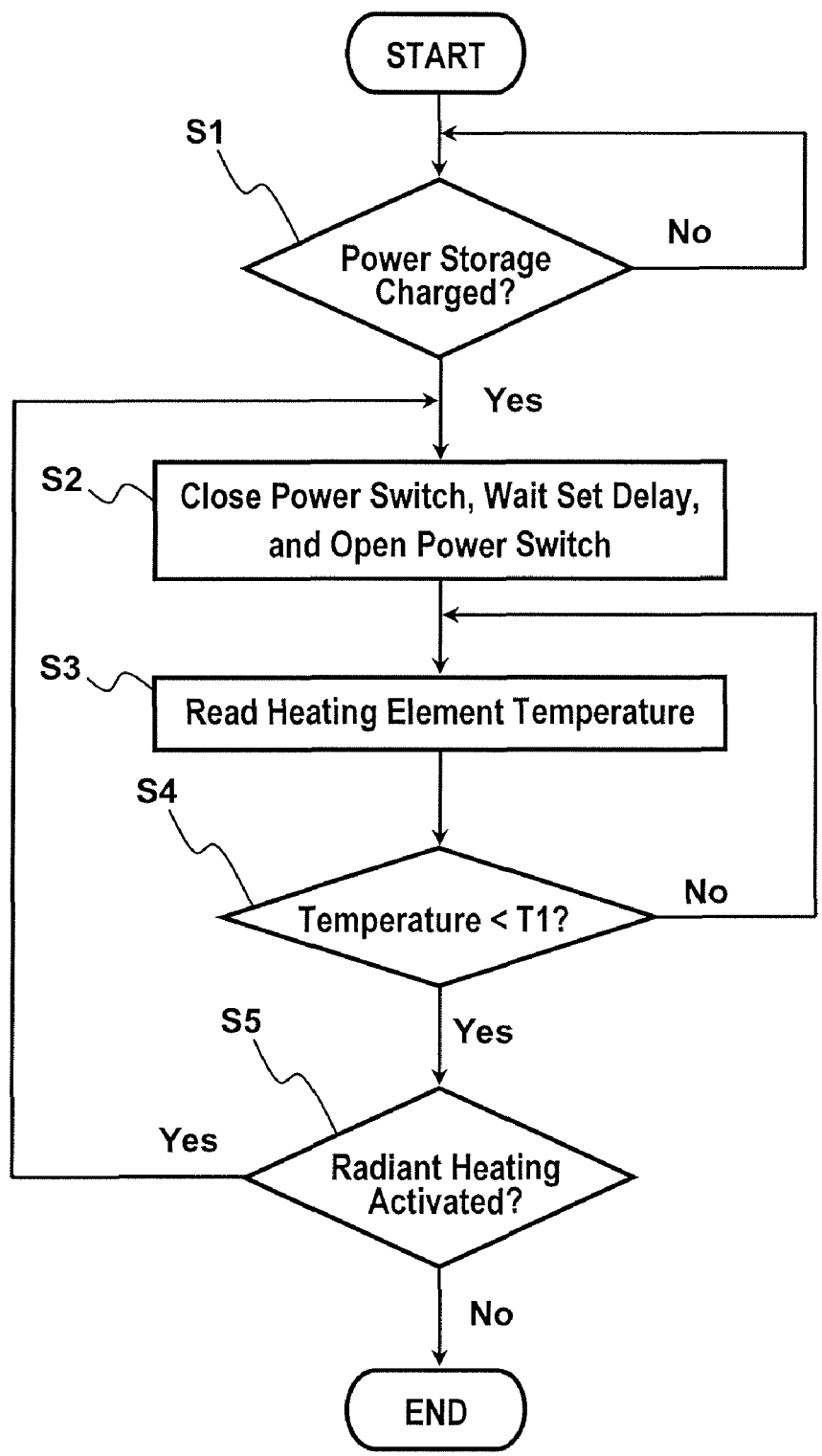
FIG. 5 is a flow chart showing an example of steps executed by the controller of the vehicle radiant heating control system to heat the vehicle cabin interior space.

Referring now to FIG. 5, a flow chart is illustrated that shows an example of operations executed by the controller 16 of the vehicle radiant heating control system 14 to heat the vehicle cabin interior space 12 using the lower radiant heating elements 20 and/or the upper radiant heating elements 22. The operations of the flow chart are initiated after the vehicle is started (ignition "on") and the user turns on the vehicle radiant heating control system 14. The process of the flow chart of FIG. 5 will be executed at prescribed intervals once the user interface 18 is set to a heating application (e.g., a floor heat mode, a defog mode, defrost mode, or a full heat mode activating both the lower and upper radiant heating elements 20 and 22).

In step S1, the controller 16 determines if the power storage device 42 is charged to a level designed to deliver a pulse of energy forcing the radiant heating elements 20 and/or 22 to emit infrared waves. If the power storage device 42 is charged to the prescribed level, then the process executed by the controller 16 proceeds to step S2. However, if the power storage device 42 has not reached the prescribed level, then the process executed by the controller 16 repeats step S1 until the power storage device 42 has reached the prescribed level.

In step S2, the controller 16 sends a signal to close the power switch 44, and then subsequently after a time period has elapsed, the controller 16 sends a signal to open the power switch 44. Next, the process executed by the controller 16 proceeds to step S3.

In step S3, the controller 16 receives signals from the temperature sensors 34 and/or 36 depending on the operation mode to determine a measured temperature Tm, which is indicative of actual temperatures in front of the radiant heating elements 20 and/or 22, and then proceeds to step S4.

In step S4, the controller 16 compares the measured temperature Tm with a prescribed temperature value T1. If the measured temperature Tm is less than the prescribed temperature value T1, then the process executed by the controller 16 proceeds to step S5. However, if the measured temperature Tm is greater than the prescribed temperature value T1, then the process executed by the controller 16 repeats steps S3 and S4 until the measured temperature Tm is less than the prescribed temperature value T1.

In step S5, the controller 16 determines whether the radiant heating elements 20 and/or 22 are currently activated or not. If the radiant heating elements 20 and/or 22 are currently inactivated, then the process executed by the controller 16 ends. However, if the radiant heating elements 20 and/or 22 are currently activated, then the process executed by the controller 16 proceeds back to step S2 so as to continuously repeat steps S2 to S5, until the radiant heating elements 20 and/or 22 are inactivated or the vehicle 10 is turned off.

Thus, the method for operating the vehicle radiant heating control system 14 is basically performed by the HVAC controller 16 supplying power generated by the power source (e.g., the battery 30) to the radiant heating elements 20 and/or 22 for a predetermined time period. Then, the controller 16 interrupts the supplying of power to the radiant heating elements 20 and/or 22 upon expiration of the predetermined time period. Next, the controller 16 detects a temperature of the radiant heating elements 20 and/or 22 after the interrupting of the supplying of power. Finally, the controller 16 subsequently resupplies power to the radiant heating elements 20 and/or 22 in response to the temperature of the radiant heating elements 20 and/or 22 being detected as being below a predetermined temperature from the detecting of the temperature of the radiant heating elements 20 and/or 22.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle radiant heating control system comprising:
a radiant heating element;
a power source operatively connected to the radiant heating element; and
a controller operatively controlling the radiant heating element and the power source with the controller operating the radiant heating element by intermittently supplying power generated by the power source to the radiant heating element, the controller including a power converter that increases an electric potential of the power generated by the power source.

2. The vehicle radiant heating control system according to claim 1, further comprising
a user interface operatively connected to the controller, with the controller activating the radiant heating element via the user interface.

3. The vehicle radiant heating control system according to claim 1, further comprising
a temperature sensor operatively connected to the controller, with the temperature sensor detecting a temperature of the radiant heating element.

4. The vehicle radiant heating control system according to claim 3, wherein
the controller intermittently supplies power to the radiant heating element based on the temperature of the radiant heating element such that the controller supplies power to the radiant heating element for a predetermined time period when the temperature of the radiant heating element is below a predetermined temperature.

5. The vehicle radiant heating control system according to claim 4, wherein
the controller interrupts the supply of power to the radiant heating element following the predetermined time period.

6. The vehicle radiant heating control system according to claim 1, wherein
the controller further comprises a power switch, with the controller interrupting the supply of power to the radiant heating element by changing an operating state of the power switch.

7. The vehicle radiant heating control system according to claim 1, further comprising
a vehicle ignition operatively connected to the controller, with the vehicle ignition enables operation of the controller.

8. The vehicle radiant heating control system according to claim 1, wherein
the power source generates power having a direct current electric potential.

9. The vehicle radiant heating control system according to claim 1, wherein
the power source generates power having a 12-volt electric potential.

10. The vehicle radiant heating control system according to claim 1, wherein
the radiant heating control system supplements heating operations of an air-circulation heating system in the vehicle.

11. The vehicle radiant heating control system according to claim 1, wherein
the controller further comprises a power storage device that is charged while the controller interrupts the supply of power to the radiant heating element.

12. The vehicle radiant heating control system according to claim 11, wherein
the power storage device is a capacitor.

13. The vehicle radiant heating control system according to claim 11, wherein
the power source generates power having a direct current, 12-volt electric potential.

14. A vehicle radiant heating control system comprising:
a radiant heating element;
a power source operatively connected to the radiant heating element; and
a controller operatively controlling the radiant heating element and the power source with the controller operating the radiant heating element by intermittently supplying power generated by the power source to the radiant heating element, the controller including a power storage device that is charged while the controller interrupts the supply of power to the radiant heating element.

15. The vehicle radiant heating control system according to claim 14, wherein
the power storage device discharges when the controller supplies power to the radiant heating element.

16. The vehicle radiant heating control system according to claim 14, wherein
the power storage device is a capacitor.

17. A vehicle radiant heating control system comprising:
a radiant heating element;
a power source operatively connected to the radiant heating element;
a controller operatively controlling the radiant heating element and the power source with the controller operating the radiant heating element by intermittently supplying power generated by the power source to the radiant heating element; and
a passenger heating element and a passenger presence sensor operatively connected to the controller for operation by the controller, with the passenger presence sensor detecting an occupancy status of a passenger seat.

18. The vehicle radiant heating control system according to claim 17, wherein
the radiant heating element is located proximate a driver seat and the passenger heating element is located proximate the passenger seat, and
the controller suspends operation of the passenger heating element when the passenger presence sensor detects an occupancy status indicative of the passenger seat being vacant.

19. The vehicle radiant heating control system according to claim 17, wherein
the controller further comprises a power storage device that is charged while the controller interrupts the supply of power to the radiant heating element.

20. The vehicle radiant heating control system according to claim 19, wherein
the power storage device is a capacitor.

* * * * *